United States Patent [19]

Akerib

[11] Patent Number: 4,999,998
[45] Date of Patent: Mar. 19, 1991

[54] METHOD AND APPARATUS FOR ELIMINATION OF TOXIC OXIDES FROM EXHAUST GASES

[75] Inventor: Richard Akerib, Westminster, Colo.

[73] Assignee: E-Quad, Inc., Westminster, Colo.

[21] Appl. No.: 297,493

[22] Filed: Jan. 17, 1989

[51] Int. Cl.$^5$ ............................................. F01N 3/00
[52] U.S. Cl. ........................................ 60/274; 55/1; 55/66; 55/DIG. 30; 60/275; 60/311
[58] Field of Search .............. 60/274, 275, 311; 55/2, 55/66, 1, DIG. 30

[56] References Cited

U.S. PATENT DOCUMENTS

| | | | |
|---|---|---|---|
| 3,154,682 | 10/1964 | Hartz | 55/131 |
| 3,239,317 | 3/1966 | Rhodes | 55/276 |
| 3,768,258 | 10/1973 | Smith et al. | 60/275 |
| 4,313,739 | 2/1982 | Douglas-Hamilton | 55/2 |
| 4,338,784 | 7/1982 | Liu et al. | 60/274 |
| 4,345,572 | 8/1982 | Suzuki et al. | 123/568 |
| 4,355,504 | 10/1982 | Liu et al. | 60/275 |
| 4,376,637 | 3/1983 | Yang | 55/2 |
| 4,406,119 | 9/1983 | Kamiya et al. | 60/275 |
| 4,587,807 | 5/1986 | Suzuki | 60/274 |
| 4,732,584 | 3/1988 | Coe | 55/66 |

Primary Examiner—Douglas Hart
Attorney, Agent, or Firm—John E. Reilly

[57] ABSTRACT

$NO_x$ and $SO_x$ molecules are separated from a combustion exhaust gas stream by directing the exhaust gases through an elongated passageway, establishing a logarithmic potential across that passageway which will cause separation of the $NO_x$ and $SO_x$ molecules from the exhaust gases based on their permanent dipole moments, the potential being established between spaced conductors and at a relatively low voltage level sufficient to generate a capacitance between the conductors sufficient to cause separation of the molecules from the exhaust gas stream for recovery in a separate chamber.

9 Claims, 1 Drawing Sheet

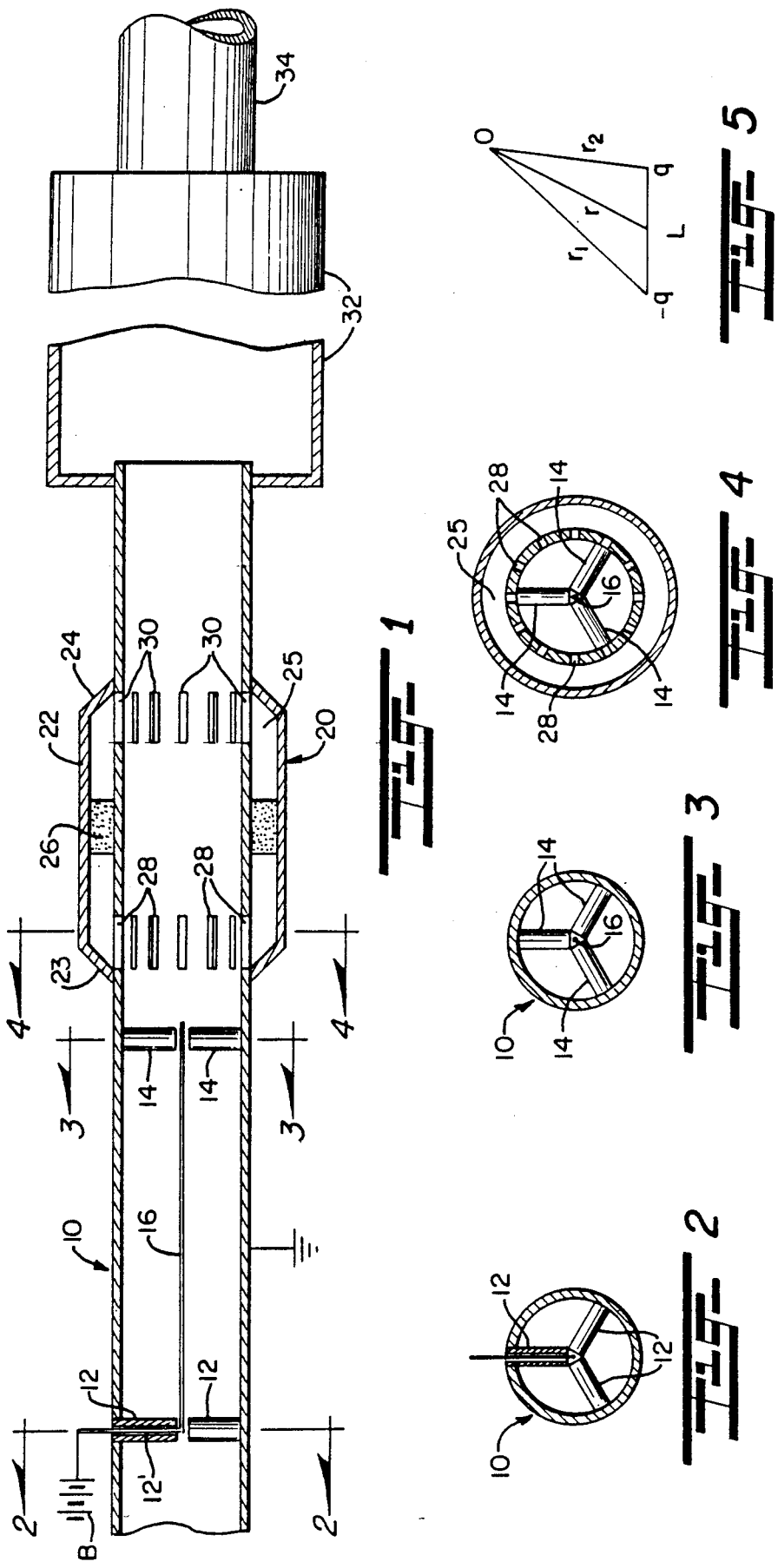

METHOD AND APPARATUS FOR ELIMINATION OF TOXIC OXIDES FROM EXHAUST GASES

This invention relates to a method and means for removal of contaminants from gases; and more particularly relates to a novel and improved method and apparatus for the elimination of nitrogen oxides ($NO_x$) and sulfur oxides ($SO_x$) from combustion exhaust gases.

BACKGROUND AND FIELD OF INVENTION

Numerous approaches have been taken in the removal of certain contaminants from exhaust gases. For example, there has been widespread utilization of catalytic converters in removing certain contaminants or toxic gases from automotive or combustion exhaust emissions. Ion generators have been employed to remove pollutants from exhaust gases and, for example, reference is made to U.S. Pat. No. 3,768,258 to H. W. Smith et al.

In U.S. Pat. No. 4,406,119 to S. Kamiya et al, a wire electrode is utilized in combination with a filter cake for removing contaminants from an exhaust gas stream. Specifically, the electrode serves as a means of electrically heating the gases in order to precipitate out selected particles but also implies utilization of a corona discharge.

In U.S. Pat. No. 4,345,572 and 4,587,807 to N. Suzuki et al, an electrostatic filter pipe connected to a dust connector is used to reduce $NO_x$ in the exhaust gas. U.S. Pat. No. 4,355,504 to B. K. Liu et al is concerned with the collection and removal of particles from an exhaust gas.

U.S. Pat. No. 4,376,637 to L. C. Yang employs an electrode in an exhaust conduit as a means of repelling exhaust particles wherein the electrode is mounted by insulated holding brackets and the particles are repelled by means of a spark discharge through an annular scoop into a discharge grid and filter. U.S. Pat. No. 4,313,739 to D. H. Douglas-Hamilton also utilizes an insulated wire electrode in combination with a porous cylinder for removing contaminants from gases. The primary emphasis in Douglas-Hamilton, however, is utilization of a lower pressure outside of the cylinder to encourage removal of the particles.

Among the most harmful of the gases formed in combustion exhaust of diesel or internal combustion engines is nitrous oxide but, at the same time, is perhaps the most difficult of the toxic gases to efficiently remove. In addition to catalytic converters, scrubbers have been devised to the end of efficient removal of nitrous oxide gases but have not been found to be very practical or efficient for use in automotive, furnace and turbine engines employing hydrocarbon fuels. Molecules, such as, NO, $NO_2$ and $SO_2$ are not symmetrical in their structure. They exhibit a permanent dipole moment which is known quite accurately from molecular spectroscopy. Although this dipole moment is small, analysis of the motion of a dipole in an electric field shows that, if the electric field varies as a function of the distance, the dipole will start moving in that direction and describe a path which is directly proportional to the dipole moment and the mass of the molecule. Thus, each molecule which enters the field will move along a fixed path determined by its dipole moment and its mass. Other components of the exhaust, such as, carbon monoxide, water and ozone also have dipole moments. However, since their masses are different, the paths that they follow will also be different. It is therefore important to provide for the efficient removal of $NO_x$ and $SO_x$ molecules from a combustion exhaust stream by reflecting those molecules away from the stream based on their dipole moments and to separately collect or filter out those molecules so that they will not exit or be discharged into the atmosphere with the other gases.

SUMMARY OF INVENTION

It is therefore an object of the present invention to provide for a novel and improved method and apparatus for the efficient removal of $NO_x$ and $SO_x$ gases from an exhaust gas stream.

Another object of the present invention is to provide for a novel and improved method and means for removal of $NO_x$ and $SO_x$ gases from a combustion exhaust which requires a minimum number of parts, has minimal power requirements, and is readily conformable for use in standard exhaust systems for the efficient and dependable removal of contaminant gases.

A further object of the present invention is to provide for a novel and improved method and apparatus for the removal of $NO_x$ and $SO_x$ gases from combustion exhaust emissions which is capable of deflecting those toxic gases out of a mainstream of the gases and separately collecting same in such a way as not to interrupt or retard the flow of the exhaust gases; and further wherein the method and means of the present invention does not require replenishment of chemicals or the replacement of parts.

A further object of the present invention is to provide for a novel and improved apparatus in which a capacitative electric field is established in an exhaust duct of a combustion engine to efficiently separate nitrogen and sulfur oxide molecules from other exhaust molecules based on the dipole moments of the molecules whereby to cause the separated molecules to be deflected out of the exhaust duct into a separate chamber and prevent their discharge into the atmosphere.

In accordance with the present invention, the principles of the present invention are best exemplified by describing its use in connection with an internal combustion engine wherein an exhaust pipe or manifold includes insulated holders for a wire element which is positioned to extend a finite distance along the central axis of the exhaust. A series of slots are disposed in circumferentially spaced relation through a portion of the pipe downstream of the wire, and a chamber is disposed in surrounding relation to the slotted portion of the pipe. Accordingly, when exhaust gases are directed through the pipe and a relatively low voltage on the order of 12 volts is applied to the wire element, a capacitance is established between the wire element and the grounded pipe which will cause $NO_x$ and $SO_x$ molecules in the exhaust stream to be deflected at a predetermined angle of departure away from the main exhaust gas stream in accordance with the dipole moments of the molecules. Although this moment is small, it is sufficient to deflect the molecules along a predetermined path so as to intersect or pass through at the slotted portion and into a chamber where they can be collected or entrapped.

The present invention is more broadly characterized by apparatus for separating $NO_x$ and $SO_x$ from any combustion exhaust gas stream, such as, wood, coal, waste matter, hydrocarbon fuels or fuel oils and comprising means for directing the exhaust gas stream through an elongated passageway, such as, a duct or pipe, and means for establishing a voltage across that passageway which will cause separation of said $NO_x$ and $SO_x$ molecules present in the exhaust gas stream based on the dipole moments of those molecules.

The method for separating $NO_x$ and $SO_x$ molecules from a combustion exhaust gas stream, in accordance with the present invention, comprises the steps of directing the exhaust stream through an elongated passageway, positioning electrical conductor elements in the passageway in radially spaced relation to one another, applying a voltage to the spaced conductors whereby to establish a capacitive charge across the conductors sufficient to separate the $NO_x$ and $SO_x$ molecules from the exhaust gas stream based on the permanent dipole moments of the molecules, and providing a series of apertures in a wall of the passageway at a predetermined location with respect to the conductors and in the path of the $NO_x$ and $SO_x$ molecules deflected from the exhaust gas stream for recovery in a separate chamber.

The above and other objects, advantages and features of the present invention will become more readily understood and appreciated from a consideration of the following detailed description of a preferred embodiment thereof when taken together with the accompanying drawings, in which:

DESCRIPTION OF THE DRAWINGS

FIG. 1 is a somewhat schematic view, partially in section illustrating a preferred embodiment of the invention installed in the exhaust pipe of an internal combustion engine;

FIG. 2 is a cross-sectional view taken about lines 2—2 of FIG. 1;

FIG. 3 is a cross-sectional view taken about lines 3—3 of FIG. 1;

FIG. 4 is cross-sectional view taken about lines 4—4 of FIG. 1; and

FIG. 5 is a vector diagram of the dipole mement exhibited by a molecule in an exhaust stream.

DETAILED DESCRIPTION OF THE PREFERRED EMBODIMENT

As illustrated in FIGS. 1 to 5, a preferred form of apparatus in accordance with the present invention is installed in an exhaust duct or pipe 10 of an internal combustion engine, such as, customarily employed in a motor vehicle and, for example, is located at the Y of the exhaust manifold. A series of radially extending insulated holders 12 and 14 are disposed at axially spaced intervals in the pipe to support an electrically conductive wire element 16 of a fixed length along the central axis of the pipe. As shown, the fixed wire element 16 extends radially through one of the holders 12 and outwardly through a limited opening in the pipe for electrical connection to a suitable DC power source, such as, a 12-volt car battery B. The insulated holders 12 cooperate to support one end of the wire element 16 centrally of the pipe 10, and the holders 14 similarly serve to centrally support the opposite end of the wire. That portion of the wire element designated at 12' is insulated by the ceramic holders 12 but is exposed along its length between the holders and, for the purpose of illustration but not limitation, would typically extend for a distance on the order of 5 cm to 10 cm for a pipe having a diameter on the order of 6 cm. Preferably, the wire 16 is a high temperature metal wire having a melting point of about 2200° F. and a diameter of 0.19 cm. In turn, the wire holders 12 and 14 are ceramic posts which are bonded to the inner wall of the pipe and serve to isolate the wire 16 from the exhaust pipe 10. In addition, the pipe is grounded as at 18 in order to establish an electric field or potential between the fixed wire 12 and the conductive pipe 10.

A bypass in the form of a generally tubular jacket 20 is disposed in outer concentric, surrounding relation to a portion of the pipe 10 downstream of the wire element 16, the jacket having a straight cylindrical portion 22 and generally conical ends 23 and 24 which converge inwardly from opposite ends of the cylindrical portion 22 into the external surface of the pipe so as to form an enclosed annular chamber 25. Disposed centrally of the chamber 25 is a suitable filter 26 to be hereinafter described in more detail. The pipe 10 is provided with axially spaced slotted portions 28 and 30 in communication with opposite ends of the chamber 25. The slotted portions 28 are disposed in adjacent but spaced relation to the wire element 16 and downstream of the wire element at a point in the pipe which will intercept the $NO_x$ and $SO_x$ molecules separated from the exhaust gas stream and permit their removal into the chamber 25. Those molecules or gases not entrapped or collected by the filter 26 are free to return through slotted portions 30 into the exhaust stream passing through the pipe and continue through muffler 32 and tailpipe 34 for discharge into the atmosphere.

The combustion process produces nitrogen oxides ($NO_x$) from fuel and nitrogen oxides ($NO_x$) and sulfer oxides ($SO_x$) from fuel oils. The two pollutants are the main contributors to the formation of acid rain. In the following, we shall consider the separation of the $NO_x$ and $SO_x$ molecules from the exhaust of an engine when subjected to an electric field. The components of the exhaust and their respective dipole movements are:

TABLE I

| Molecule | Atomic Mass | Dipole Moment (Debye) | Velocity "v" at 1200° F. (meter/sec) |
|---|---|---|---|
| $CO_2$ | 44 | 0.0 | 723 |
| CO | 28 | 0.112 | 906 |
| NO | 30 | 0.153 | 875 |
| $NO_2$ | 46 | 0.316 | 707 |
| $H_2O$ | 18 | 1.85 | 1130 |
| SO | 48 | 1.55 | 692 |
| $SO_2$ | 64 | 1.63 | 600 |

(1 Debye = $10^{-18}$ esu-cm = $3.3356 \times 10^{-30}$ coulomb-meter)

The velocity of the molecules is derived in statistical mechanics and is related to the absolute temperature of the gas. The average value of the velocity is:

$$mv^2/2 = 3kT/2$$

wherein m is the mass of the molecule, k is Boltzman's constant and T is the absolute temperature in degrees Kelvin. In the case of exhaust gases, if we assume a temperature of 1200° F. at the Y of the exhaust manifold, we can calculate the average velocities of the various molecules. These are given as the fourth column of Table I.

A dipole is defined as two equal and opposite charges q and q' separated by a distance L as depicted in FIG. 5. If we calculate the potential at point O due to the dipole, we have:

$$V = -q/r_1 + q/r_2$$

From FIG. 5, we have:

$$r_1 = r + L/2 \text{ and } r_2 = r - L/2$$

It follows from this that $$1/r_1 = 1/\{r + L/2\} = 1/\{r + L r \cos\theta + L^2/4\}^{1/2} \text{ where } \theta \text{ is the angle between } r \text{ and } L \quad (2)$$

or $$1/r_1 = (1/r) \{1 + L \cos\theta/r + (L/2r)^2\}^{1/2} \quad (3)$$

The distance $L \ll r$; hence we can expand the square root and neglect all terms of powers higher than the 1st; it follows that $$1/r_1 = \{1 - L \cos\theta/2r\}/r$$

similarly
$$1/r_2 = \{1 + L \cos\theta/2r\}/r$$

thus:
$$V = q L \cos\theta/r. \quad (4)$$

The quantity $p = qL$ is defined as the dipole moment $p$ and is a vector directed from the negative to the positive charge.

A molecule such as NO is not symmetrical. This means that the odd electron in N is shared by both molecules and provides the bond between them. Thus, the 0 atom will represent a negative ion and the N atom is positive. This presents a separation of equal but opposite charges and hence a permanent dipole. On the other hand, a molecule, such as, $O_2$ or $CO_2$ is symmetrical and will therefore not exhibit a permanent dipole moment.

We will now proceed to consider the motion of a dipole in an electric field and will neglect the dipole moment induced by the electric field. We are concerned here with showing that the electric field will separate the molecules. Consideration of the induced dipole moment will unnecessarily complicate the calculations. We assume that the electric field E is a function of z only and is directed along the z-axis. Thus $$E = kE(z) \quad (5)$$

Thus the force F on the dipole will be $$\begin{aligned} F &= \text{grad}(p \cdot E) \\ &= (p \cdot \text{grad})E \\ &= k(p \cdot \text{grad})E \\ &= kp_z \, dE/dz \end{aligned} \quad (6)$$

By Newton's law, we have, for the acceleration "a" along the z-axis $$a = (pz/m)dE/dz \quad (7)$$

Similarly, the torque exerted by the field on the dipole will lead to the angular acceleration $$\vec{\alpha} = (iP_y - jP_x)E(z)/I \quad (8)$$

where I is the moment of inertia of the dipole and i, j and k are unit vectors along the X, Y and Z axes, respectively. Thus, the dipole will rotate in the x-y plane and will be accelerated in the z direction. Since the angular acceleration will not change the magnitude of the x and y component of the initial velocity of the particle, then the field will have the effect of moving the particles in a parabolic path.

We assume that the electric field is:

$$E(z) = E_0 f(z) \quad (9)$$

We also assume that the velocity of the molecules makes an angle $\phi$ with the electric field and that the dipole direction is along the z-axis.

The equation of motion of the dipole is $$d^2z/dt^2 = (p/m)(dE/dz) \quad (10)$$

This leads to $$v^2 = 2pE(z)/m + A' \quad (11)$$

where $A'$ is a constant of integration. Using equation (9), we have:

$$dz/dt = \alpha\{f(z) + A\}^{1/2} \quad (12)$$

where A is a constant and
$$\alpha^2 = 2pE_0/m. \quad (13)$$

The solution of the above equation is
$$\alpha t + B = \int\{f(z) + A\}^{1/2} dz \quad (14)$$

where A and B are integration constants depending on the initial conditions:

$$\text{at } t = \phi \; v = v_0\cos\theta \text{ and } z = \phi \quad (15)$$

The motion in the X-Y plane is uniform and given by $$r = v_0 t \sin\theta \quad (16)$$

We will now examine the logarithmic potential where the electric field behaves as $1/r$. In this case the solution will be $$\alpha \sqrt{A\,t} - \{r(r + V_0/A)\}^{1/2} - V_0\{\log\,[r^{1/2} + (r + V_0/A)^{1/2}] - \log(V_0/A)^{1/2}\}/A \quad (17)$$

with
$$A = m(v\sin\theta)^2/pV_0 \quad (18)$$

The above solutions were computed for a number of incident angles O and a temperature of 1200° F. The applied voltage was assumed at 12V. The computations were done for CO, NO, $NO_2$ and $SO_2$. The results are given in Table III for an angle of incidence of 31' with the Z-axis. The displacement z, the motion r in the original direction and the position vector R are in cm; the time is in sec. and the angle is in deg.

TABLE II

|    | t     | z    | r    | R    | Angle |
|----|-------|------|------|------|-------|
| CO | .0001 | 7.8  | 6.6  | 10.2 | 50    |
|    | .0002 | 15.5 | 13.2 | 20.3 | 50    |
|    | .0003 | 23.3 | 19.8 | 30.1 | 50    |
|    | .0004 | 31.1 | 26.4 | 40.7 | 50    |
|    | .0005 | 38.8 | 33.0 | 50.9 | 50    |
| NO | .0001 | 7.5  | 6.4  | 9.8  | 50    |
|    | .0002 | 15.0 | 12.7 | 19.7 | 50    |

TABLE II-continued

|  | t | z | r | R | Angle |
|---|---|---|---|---|---|
|  | .0003 | 22.5 | 19.1 | 29.5 | 50 |
|  | .0004 | 30.0 | 25.5 | 39.4 | 50 |
|  | .0005 | 37.5 | 31.9 | 49.2 | 50 |
| NO2 | .0001 | 6.1 | 5.1 | 7.9 | 50 |
|  | .0002 | 12.1 | 10.3 | 15.9 | 50 |
|  | .0003 | 18.2 | 15.4 | 23.8 | 50 |
|  | .0004 | 24.2 | 20.6 | 31.8 | 50 |
|  | .0005 | 30.3 | 25.7 | 39.7 | 50 |
| SO2 | .0001 | 5.1 | 4.3 | 6.7 | 50 |
|  | .0002 | 10.3 | 8.7 | 13.4 | 50 |
|  | .0003 | 15.4 | 13.1 | 20.2 | 50 |
|  | .0004 | 20.5 | 17.5 | 27.0 | 50 |
|  | .0005 | 25.7 | 21.8 | 33.7 | 50 |

Table II shows that a measurable displacement of at least 5 cm occurs. The displacement is dependent on the ratio of the dipole moment to the mass of the molecule. In Table III there is summarized for the logarithmic potential the data for various species at the same instant of time (0.001 sec) and at an incident angle of 41' for comparison purposes.

TABLE III

| Species | Mass m | Dipole moment p | p/m | Radial Displacement (cm.) |
|---|---|---|---|---|
| CO | 28 | 0.112 | 0.0040 | 8.4 |
| NO | 30 | 0.153 | 0.0051 | 8.1 |
| NO2 | 46 | 0.316 | 0.0069 | 6.6 |
| SO2 | 64 | 1.630 | 0.0255 | 5.5 |

Table III shows that as the ratio p/m increases the deflection decreases. This means that the path is less curved and thus will reach the walls of the exhaust pipe at different points. We can thus place an opening at these points to direct the molecules into a different pipe that will allow them to be trapped by a filter. The tables also show that the combination of the motion in the X-Y plane and the motion along the Z-axis will be such that the exhaust gases will be separated according to species and move along different angles to the Z-axis. This means therefore that we can direct $NO_x$ molecules to an exit point where they can be trapped by a variety of material. Thus, for a pipe having a diameter on the order of 6 cm, the exit point would be located an axial distance of about 10 cm from the junction where the electric field is generated.

In the preferred form as illustrated, the logarithmic potential involves treating the exhaust pipe 10 as the outer plate of a cylindrical capacitor and the inner plate being the wire 16 placed along the center axis of the pipe 10. Again, the wire may be on the order of 5 cm in length and maintained at a potential of 12 volts. The following assumptions have been incorporated into the preceding studies:

(a) the average velocities of the molecules have been used; no account has been taken of the maxwellian distribution of the velocities; (b) it has been assumed that the exhaust gases form an ideal compressible gas; thus the effect of pressure waves in the exhaust pipe has not been taken into account; (c) no account has been taken of the dipole moment induced by the electric field which in turn leads to a polarization field and may modify the deflection of a particular molecule; (d) no account has been taken of the end effects in the production of the electric field; and (e) it is assumed that no collisions take place between molecules in the gas; collisions may modify the deflection.

From the foregoing, it is possible to calculate the electric field as a function of the applied potential and determine the corresponding deflections of the molecules; also to determine the potential necessary to deflect particular molecules out of a given gas stream. Specifically, for a wire 16 having a length L and a diameter of "a" centimeters, the diameter of the pipe 10 is designated as "b" meters and will form a cylindrical capacitor with the wire 16. A voltage is applied to the wire and the pipe 10 is grounded as illustrated so that the potential will be generated in the region between the wire 16 and the pipe 10. Assuming that the Z-axis is along the wire, there will be no field along that axis but instead will be cylindrically symmetrical and not have an angular dependence. The potential will be subject to Laplace's equation and is determined as follows:

$$(1/r)d[r \, dV/dr]/dr = 0 \qquad (19)$$

The solution of this equation is $$V = A \log(r) + B \qquad (20)$$

subject to the conditions $$\text{at } r = a \quad V = V_o$$

$$\leftarrow r = b \quad V = 0$$

This leads to $$V = A \log(a) + B \qquad (21)$$

$$0 = A \log(b) + B \qquad (22)$$

Solving for A and B, we have $$V = [V_o \log(b/a)][\log(b) - \log(r)] \qquad (23)$$

The corresponding electric field will be $$E = [V_o \log(b/a)]/r \qquad (24)$$

The optimum voltage may be determined based on the equations discussed for a given wire length L, wire diameter a and pipe diameter b. When the exhaust gases are directed through the pipe 10, the wire element 16 will establish a capacitance with the grounded pipe which will cause the $NO_x$ and $SO_x$ molecules to be deflected from the mainstream at a predetermined angle of departure based on the permanent dipole moment of the gases. Although this moment is quite small, it is sufficient to cause deflection along a predetermined path so as to intersect the slotted portion of the pipe and pass into the chamber area 25 where they are collected or trapped by the filter 26. One suitable composition of material for the filter for $NO_x$ is zirconium oxide which will react with $NO_x$ and $SO_x$ molecules to form zirconium nitrite and zirconium sulfites, respectively, releasing oxygen in the process which is returned along with any other gases through the slotted portion 30 back into the mainstream. In this relation, it will be evident that it is not essential to return the gases from the bypass region or chamber 25 into the pipe 10 but instead can be discharged directly into the atmosphere without passing through the muffler 32.

It is therefore to be understood that while a preferred form of method and apparatus in accordance with the present invention have been set forth and described herein that various modifications and changes may be made without departing from the spirit and scope of the present invention as defined by the appended claims.

I claim:

1. An apparatus for separating $NO_x$ and $SO_x$ molecules from a combustion exhaust gas stream comprising:
   means for directing said exhaust gas stream through an elongated passageway; and
   means for establishing a logarithmic potential across that passageway which will cause separation of said $NO_x$ and $SO_x$ molecules from said exhaust gas stream based on the permanent dipole moments of said molecule, said means for establishing a logarithmic potential comprising radially spaced conductors in said passageway and means for applying a DC voltage between said conductors to establish the logarithmic potential necessary to cause separation of said $NO_x$ and $SO_x$ molecules from said exhaust gas stream, said elongated passageway defining one of said conductors and the other of said conductors defined by a wire of finite length, a series of circumferentially spaced slots in axially spaced relation to said wire, said means for establishing a logarithmic potential causing said $NO_x$ and $SO_x$ to be deflected through said slots.

2. The apparatus according to claim 1, including an annular chamber in outer surrounding relation to said exhaust pipe and in communication with said series of slots.

3. The apparatus according to claim 2, including filter means disposed in said chamber for entrapping said $NO_x$ and $SO_x$ molecules.

4. The apparatus according to claim 3, wherein said means for fixing said wire comprises axially spaced, insulated holders extending radially inwardly from said exhaust pipe to a central longitudinal axis of said exhaust pipe, said wire disposed for extension axially along said central axis of said exhaust pipe.

5. An apparatus for separating $NO_x$ and $SO_x$ molecules from a combustion exhaust gas stream of an internal combustion engine comprising:
   means for directing said exhaust gas stream through an elongated passageway; and
   means for establishing an electric potential across that passageway which will cause separation of said $NO_x$ and $SO_x$ molecules present in said exhaust gas stream based on the dipole moments of said molecules, said means for establishing an electric potential comprising radially spaced conductors in said passageway and a source of DC voltage which establishes a capactive field across said conductors to cause separation of said $NO_x$ and $SO_x$ molecules from said exhaust gas stream, and filter means for trapping said $NO_x$ and $SO_x$ molecules wherein said elongated passageway is an exhaust pipe defining one of said conductors and the other of said conductors is defined by a wire of finite length, and means for fixing said wire along the central axis of said exhaust pipe; and
   a series of circumferentially spaced apertures in axially spaced relation to said wire, said means for applying an electric potential causing said $NO_x$ and $SO_x$ molecules to be deflected through said apertures.

6. The apparatus according to claim 5, including an annular chamber in outer surrounding relation to said exhaust pipe and in communication with said apertures, said apertures being in the form of a series of elongated slots.

7. The apparatus according to claim 6, said filter means disposed in said chamber for entrapping said $NO_x$ and $SO_x$ molecules.

8. The apparatus according to claim 7, wherein said means for fixing said wire comprises axially spaced, insulated holders extending radially inwardly from said exhaust pipe to a central longitudinal axis of said exhaust pipe, said wire disposed for extension axially along said central axis of said exhaust pipe.

9. The method for separating $NO_x$ and $SO_x$ molecules from a combustion exhaust gas stream, comprising the steps of directing said exhaust stream through an elongated passageway, positioning electrical conductor elements in said passageway in radially spaced relation to one another, applying a voltage to the spaced conductors whereby to establish a logarithmic potential across said conductors sufficient to separate said $NO_x$ and $SO_x$ molecules from said exhaust gas stream based on the permanent dipole moments of said molecules, and providing a series of apertures in a wall of said passageway at a predetermined location with respect to said conductors and in said path of said $NO_x$ and $SO_x$ molecules deflected from said exhaust gas stream for recovery of said molecules in a separate chamber.

* * * * *